(12) United States Patent
Hamberger et al.

(10) Patent No.: US 6,658,350 B1
(45) Date of Patent: Dec. 2, 2003

(54) NAVIGATION DEVICE

(75) Inventors: Klaus Hamberger, Lenting (DE);
Wolfram Remlinger, Ingolstadt (DE);
Jurgen Schroder, Wettstetten (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/069,861

(22) PCT Filed: Sep. 6, 2000

(86) PCT No.: PCT/EP00/08676
§ 371 (c)(1),
(2), (4) Date: Jun. 4, 2002

(87) PCT Pub. No.: WO01/20580
PCT Pub. Date: Mar. 22, 2001

(30) Foreign Application Priority Data

Sep. 15, 1999 (DE) .......................... 199 44 080
Sep. 15, 1999 (DE) .......................... 199 44 081

(51) Int. Cl.⁷ .............................. G01C 21/00
(52) U.S. Cl. ....................... 701/208; 701/200
(58) Field of Search ................. 701/200, 208, 701/211, 212; 345/716, 828, 854, 855, 856

(56) References Cited

U.S. PATENT DOCUMENTS

| 4,504,913 | A | 3/1985 | Miura et al. ............. 364/449 |
| 4,608,656 | A | 8/1986 | Tanaka et al. ............ 364/449 |
| 4,935,728 | A | 6/1990 | Kley ..................... 345/161 |
| 6,404,420 | B1 * | 6/2002 | Klein et al. ............. 345/184 |

* cited by examiner

Primary Examiner—Yonel Beaulieu
(74) Attorney, Agent, or Firm—Stevens, Davis, Miller & Mosher

(57) ABSTRACT

This invention relates to a navigation device, in particular, for installing in a motor vehicle. Said device has a monitor (20), on which an image, in particular, a map can be displayed. The displacement direction of a cursor (26) on the display can be selected by turning a rotary switch (10) in an operating mode.

20 Claims, 1 Drawing Sheet

NAVIGATION DEVICE

This invention relates to a navigation device, in particular one for installation in a motor vehicle, as specified in the preamble of patent claim 1.

BACKGROUND OF THE INVENTION

Generic navigation devices with a monitor on which a map may be displayed, especially ones for use in motor vehicles, are widely known. Known from the state of the art are navigation devices in which a cursor on a map displayed on a monitor may be moved by means of a joystick. But because of the limitation of space in a vehicle provision of an additional component, in this case a joystick, which cannot be used at all for other purposes, or may be so used only to a very limited extent, is undesirable.

In another navigation device known from the state of the art the cursor may be controlled by means of a cross rocker, for which reason this solution as well is unsatisfactory. This alternative also presents the disadvantage that the cursor may be moved in only eight directions. Hence moving the cursor in any directions desired proves to be a complicated process.

This applies also to another navigation device known from the state of the art, in which first one coordinate of the cursor may be brought to the desired coordinate by means of a rotary switch and then, after a change-over process initiated by pressing the rotary switch, to the other coordinate extending perpendicular to the first one.

SUMMARY OF THE INVENTION

In this context the object of the invention is further development of a generic navigation device in such a way that control of a cursor can be made possible in a simple and user friendly manner, the space required for the control device being kept as small as possible.

This object is attained by a navigation device as specified for the features specified in patent claim 1. The dependent claims relate to especially advantageous developments of the invention.

The invention is based on the assumption that cursor control may be divided into two individual aspects, one being selection of a direction of movement of the cursor, and the other triggering or execution of a cursor movement. Hence it is claimed for the invention that a navigation device is provided in which the direction of movement of a cursor on the image of a navigation device is selected by rotation of a rotary switch. As a result the user gains the perception of rotating the cursor, preferably represented by an arrow, by hand. In this way the direction of movement of the cursor, not just when the cursor is at rest but also when it is in movement, can be set with much flexibility and the user is not restricted to eight different directions, such as right, left, up, and down. Hence use of a rotary switch is especially advantageous, since such a switch is already present in virtually every vehicle, in contrast to a rocker switch or a joystick. The function of cursor control without an additional component, that is, without an additional space requirement and with minimum additional cost, can be performed by use of a rotary switch already present, for example, one in another axial position, that is, without the need for additional space and at additional minimum cost.

In another operating mode the scale of the image may be selected by rotating the rotary switch. While the rotary switch may still be used for other operational functions of the navigational device, for example, in other axial positions, the operating comfort of the navigational device is further increased.

One advantageous development of the invention provides that the center of the image is retained during selection of the scale, since the user will instinctively select the window visible on the monitor so that the area of the image of interest to him will be situated almost in the center.

In one further development of the invention, operation of the rotary switch, for example, rotation of the rotary switch or application of axial force to this rotary switch, in another operating mode, movement of a cursor may be executed in a selected direction or in the opposite direction or may be canceled, as a result of which operation of the navigation device is further simplified, since the user also does not have to reposition his hand or fingers to move the cursor. If the rotary switch has a plurality of operating modes, this function is preferably linked to the extreme positions of the rotary switch, that is, fully depressed or entirely free of pressure. Initiation or execution of a cursor movement may be carried out before or after setting a direction of movement for the cursor. In the event of initiation of a movement before setting of a direction of movement, preferably the direction of movement most recently set or movement along a previously assigned route or in the direction of a previously entered destination is to be taken as the default direction. The initial direction of the cursor may then be changed during movement of the cursor by rotation of the rotary switch in the direction desired.

If movement of the cursor is initiated by application of axial force to the rotary switch, for example, for a predetermined period of time, the advantage is obtained that, especially during prolonged movement of the cursor in one direction there is no need for repeated movement of hand or fingers in one direction, but rather the hand or fingers may remain in the same position on the rotary switch during cursor movement.

Provision may also be made such that in another operating mode one function may be selected by rotating the rotary switch. An embodiment such as this makes addition of numerous function keys superfluous and the operating unit of the navigation device claimed for the invention remains clearly indicated. The operating mode and/or at least one of the additional operating modes may be selected by means of the function. The operating mode could consequently be selected also by rotating the rotary switch, so that all the operating steps required for use of the navigation device can be carried out with the rotary switch.

Another embodiment of the invention provides that the operating mode and/or at least one of the additional operating modes can be set by actuating at least one additional rotary, pressure, and/or slider switch. This embodiment is highly advantageous when the operating mode must be changed very frequently.

In an advantageous development of the invention the operating mode and/or at least one of the additional operating modes may be set by application of at least one application of axial force over a predetermined period to the rotary switch, preferably against the force of a spring. This development is especially easy to operate if only a few operating modes are used.

BRIEF DESCRIPTION OF THE DRAWINGS

One embodiment of the invention is described in what follows with reference to accompanying drawings, in which FIG. 1 showing a top view of a schematic representation of a rotary switch of the navigation device claimed for the invention;

DETAILED DESCRIPTION OF THE INVENTION

Figure 1:
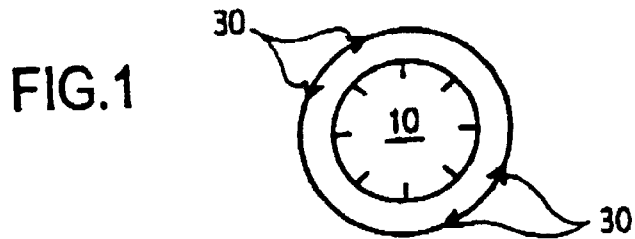
Figure 2:
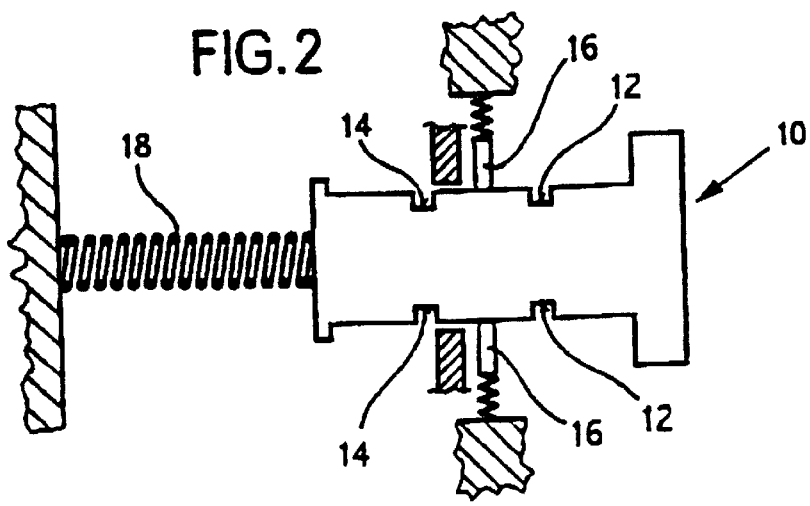
FIG. 2 a schematic representation of a rotary switch as illustrated in FIG. 1 in a side view.

A rotary switch 10 shown in FIGS. 1 and 2 is mounted in a location in a vehicle ergonomically favorable to the user. In addition to operation of the navigation device, this rotary switch 10 is used for other purposes as well, that is, for operation of other devices in the motor vehicle, for example, to operate a car phone, a CD player, and the like. As is indicated by the arrows 30, this rotary switch 10 may be rotated clockwise and counterclockwise, and in addition may be shifted to other positions by axial movement, the user experiencing a haptic response during transition among individual positions. The rotary switch 10 has a first recess 12 and a second recess 14 in which catching elements 16 may catch, so that the rotary switch may be immobilized in two different axial positions. A movement from the equilibrium position shown in FIG. 2 is made against the force of a spring 18.

Figure 3:
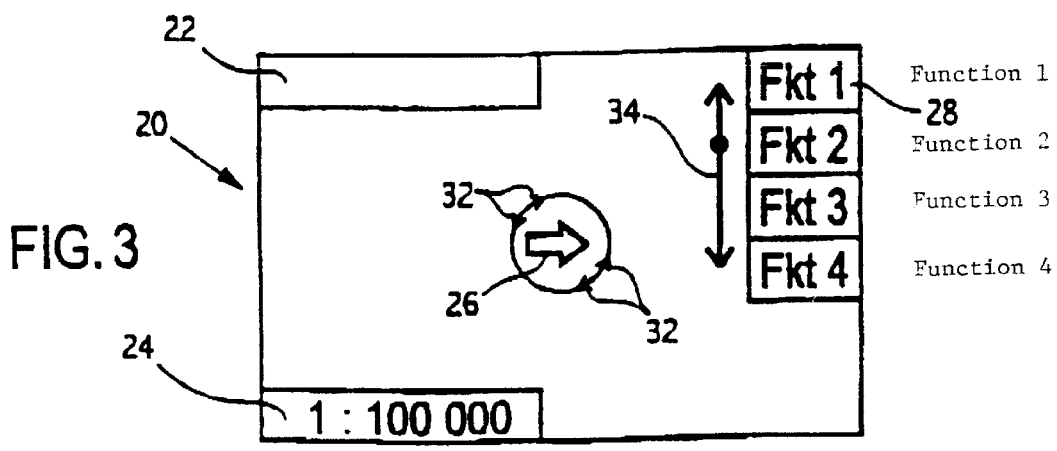
FIG. 3 a schematic representation of a monitor of the navigation device claimed for the invention.

The navigation device also has a monitor 20, shown in the form of a diagram in FIG. 3 and mounted in a motor vehicle in such a way that the device is clearly visible to the user.

The individual axial positions are correlated with various operating modes; these operating modes and their setting are described in what follows with reference to FIGS. 2 and 3.

A first axial position is to be set by pressing the rotary switch 10 to a noticeable stop, the catching elements 16 catching in the first recess 12. The operating mode "change of scale" is displayed on the monitor 20 in a first display field 22. In addition, a display symbol reproducing a current scale of a map presented is displayed in a second display field 24 on the monitor 20. The scale of the map may now be varied by rotating the rotary switch 10, the map on the current scale being displayed simultaneously on the monitor 20. If the rotary movement of the rotary switch 10 is set, the current scale of reproduction is stored and remains until a subsequent change in scale takes place.

A second axial position may be reached from the first axial position by exertion of slight pressure on the rotary switch 10 against the force of a spring 18. The rotary switch 10 does not catch in this position, but rather if this position is retained for a predetermined period of time, a different operating mode may thereby be selected. The "cursor movement-arrow direction" thereby selected is displayed in the first display field 22 on the monitor 20. Also to be seen on the monitor 20 now is a cursor 26, which begins to move in a default direction. The speed of cursor movement may be appropriately correlated with the scale of map reproduction. Change in the direction of movement of the cursor 26, as indicated by arrows 32, can be effected by rotating the rotary switch 10. In the process the cursor 26 may be displayed as an arrow on the monitor 20 in order to indicate its direction of movement. As a result of repeated pressing on the rotary switch 10 into the second axial position for a predetermined time, the operating mode "cursor movement-arrow direction" may be left again.

A third axial position can be reached from the first axial position by pulling gently on the rotary switch 10. The catch elements 16 then catch perceptibly to the user in the second recess 14 of the rotary switch 10. A preselected route is optically enhanced on the map, and in addition the current "cursor movement-route" is displayed in the first display field 22 on the monitor 20. The cursor 26 may be moved over the preselected route by rotating the rotary switch 10.

The fourth axial position is reached from the third axial position by pulling on the rotary switch 10. If [remainder of sentence (paragraph) is absent from the original.]

In another alternative embodiment the direction of cursor movement may be set when the cursor 26 is at rest. After setting has been completed, the rotary switch may be operated to initiate movement of the cursor 26 in this direction, which direction may be modified by rotation of the rotary switch 10.

In another alternative embodiment switching of operating modes may be effected, for example, by means of a rotary switch 10 mounted under the pressure exerted by a spring 28; the various operating modes are run in cycles and brief pressure applied to the rotary switch 10 once is correlated with a first operating mode, application of pressure briefly twice in succession with a second operating mode, and so forth.

What is claimed is:

1. A navigation device, for installation in a motor vehicle, having a monitor on which an image with a cursor is displayed, characterized in that the navigation device comprises a rotary switch, wherein in a first operating mode of the rotary switch a direction of movement of the cursor on the image is selected by rotation of the rotary switch independently of a movement of the cursor.

2. The navigation device as specified in claim 1, wherein a scale of the image is selected by rotation of the rotary switch in an additional operating mode.

3. The navigation device as specified in claim 2, wherein a center of the image is retained when the scale is selected.

4. The navigation device as specified in claim 1, wherein, in an additional operating mode, movement of the cursor in a selected direction of movement or in an opposite direction is effected through rotation of the rotary switch.

5. The navigation device as specified in claim 1, wherein the movement of the cursor in a selected direction or in an opposite direction is effected or canceled through the action of an axial force on the rotary switch.

6. The navigation device as specified in claim 4, wherein the direction of movement of the cursor during movement of the cursor or with the cursor at rest is changed through rotation of the rotary switch.

7. The navigation device as specified in claim 1, wherein movement of the cursor along a predetermined route in an image of a map, is effected through application of axial force to the rotary switch or through rotation of the rotary switch in another operating mode.

8. The navigation device as specified in claim 1, wherein an image is called up which is a menu containing at least one function.

9. The navigation device as specified in claim 1, wherein a function is selected in another operating mode through rotation of the rotary switch.

10. The navigation device as specified in claim 8, wherein the image comprises a map and wherein information concerning a point corresponding to a current cursor position or to the vicinity of the of the corresponding point on the map is retrieved by means of the function.

11. The navigation device as specified in claim 8, wherein the image comprises a map and wherein a point corresponding to a current cursor position on the map is set as destination or intermediate destination by means of the function.

12. The navigation device as specified in claim 8, wherein the first operating mode and/or at least one of the additional operating modes is set by means of the function.

13. The navigation device as specified in claim 9, wherein the first operating mode and/or at least one of the additional operating modes is set by means of the function.

14. The navigation device as specified in claim 1, wherein the first operating mode and/or at least one of the additional operating modes is set by actuation of an additional rotary, pressure, and/or sliding switch.

15. The navigating device as specified in claim 1, wherein the first operating mode and/or at least one of the additional operating modes is set through at least brief application of axial force to the rotary switch.

16. The navigation device as specified in claim 5, wherein the direction of movement of the cursor during movement of the cursor or with the cursor at rest is changed through rotation of the rotary switch.

17. The navigation device as specified in claim 9, wherein the image comprises a map and wherein information concerning a point corresponding to a current cursor position or to the vicinity of the of the corresponding point on the map is retrieved by means of the function.

18. The navigation device as specified in claim 9, wherein the image comprises a map and wherein a point corresponding to a current cursor position on the map is set as destination or intermediate destination by means of the function.

19. A navigation device for installation in a motor vehicle having a monitor on which an image with a cursor is displayed, characterized in that the navigation device comprises a rotary switch, wherein in a first operating mode of the rotary switch a direction of movement of the cursor on the image is selected by rotation of the rotary switch independently of a movement of the cursor and movement of the cursor in a selected direction of movement or in an opposite direction is effected through rotation of the rotary switch.

20. The navigation device as described in claim 19, wherein the monitor displays a plurality of images, at least one of which is an image of a menu.

* * * * *